US006618706B1

United States Patent
Rive et al.

(10) Patent No.: US 6,618,706 B1
(45) Date of Patent: Sep. 9, 2003

(54) METHOD AND SYSTEM FOR ALLOCATING AND DISTRIBUTING ROYALTY/COMMISSION PAYMENTS TO RESELLERS/DISTRIBUTORS

(75) Inventors: Lyndon Rive, Newark, CA (US); Ray Morgan, Fremont, CA (US)

(73) Assignee: Everdream Corporation, Fremont, CA (US)

( * ) Notice: Subject to any disclaimer, the term of this patent is extended or adjusted under 35 U.S.C. 154(b) by 0 days.

(21) Appl. No.: 09/653,828

(22) Filed: Sep. 1, 2000

(51) Int. Cl.[7] .............................................. G06F 17/60
(52) U.S. Cl. ............................................ 705/30; 705/7
(58) Field of Search .............................. 705/1, 4, 5, 7, 705/14, 26–27, 30, 400

(56) References Cited

U.S. PATENT DOCUMENTS

| | | | | |
|---|---|---|---|---|
| 5,517,406 A | * | 5/1996 | Harris et al. ................... | 705/30 |
| 6,055,511 A | * | 4/2000 | Luebbering et al. .......... | 705/14 |
| 6,134,533 A | * | 10/2000 | Shell ........................... | 705/26 |
| 6,266,774 B1 | | 7/2001 | Sampath et al. | |
| 6,360,205 B1 | * | 3/2002 | Iyengar et al. ................. | 705/5 |

FOREIGN PATENT DOCUMENTS

| | | | | |
|---|---|---|---|---|
| DE | 100 63 828 A1 | * | 5/2001 | ........... G06F/17/60 |
| JP | 2001-325545 A | * | 11/2001 | ........... G06F/17/60 |
| WO | WO 01/98990 A1 | * | 12/2001 | ........... G06F/17/60 |

OTHER PUBLICATIONS

Cespedes, Frank et al. "Managing Multiple Channels", Jul.–Aug. 1990, Business Horizons, vol. 33, No. 4, p. 67.*
"Direct Sales 'More Profitable'", Mar. 22, 1996, World Insurance Report, No. 533, p. 3.*
Coakley, Tim, "Reps Must Ride the Waves of Change Toward the Year 2000", Oct. 1997, Agency Sales Magazine, vol. 27, No. 10, pp. 17–22.*
"Tuning Into The Channel", May 11, 1998, VAR Business, p. 71.*
Elgin, Ben, "Secret Start–ups", Oct. 25, 1999, Sm@rt Reseller, vol. 2, No. 25, p. 35.*
Zaki, Hossam, "Forecasting for Airline Revenue Management", Spring 2000, Journal of Business Forecasting Methods & Systems, vol. 19, No. 1, pp. 2–6.*

* cited by examiner

*Primary Examiner*—Robert P. Olszewski
*Assistant Examiner*—Bryan Jaketic
(74) *Attorney, Agent, or Firm*—Blakely, Sokoloff Taylor & Zafman LLP (57) ABSTRACT

A system, method and related apparatus are described for reducing channel conflict between a manufacturer's direct sales channel and an indirect sales channel of independent sellers. The method generally includes receiving customer orders from the sellers or on behalf of the sellers through the indirect sales channel and receiving customer orders directly through the direct sales channel. A defined portion of the revenue derived through the direct sales channel is allocated into a compensation pool. At the end of a distribution cycle, the compensation pool is distributed among a plurality of sellers in the indirect sales channel based on each seller's sales contribution.

26 Claims, 6 Drawing Sheets

METHOD AND SYSTEM FOR ALLOCATING AND DISTRIBUTING ROYALTY/COMMISSION PAYMENTS TO RESELLERS/DISTRIBUTORS

BACKGROUND OF THE INVENTION

1. Field of the Invention

The present invention generally relates to a method and system for processing data and in particular, to a method for allocating and distributing royalty/commission payments to resellers/distributors and a computer system for effectuating such allocation and distribution.

2. Description of the Related Art

In order to increase market share, manufacturers including manufacturers of personal computers (PCs) are expanding their business strategy to include a multi-channel sales and distribution system, where a mix of direct and indirect sales channels are employed to distribute their products and services. With the goal of ensuring effective and efficient sales, distribution and support in the expanding and competitive PC market, PC manufacturers use various distribution channels including without limitation OEMs (original equipment manufacturers), value-added resellers (VARs) channel, brick and mortar retail stores, distributors, etc.

With the emergence of the Internet and other technical changes in the marketplace, manufacturers are now able to market and sell products and services "directly" to the end user. For example, many OEMs (e.g., personal computer manufacturers) have added a direct sales channel to existing channels in an effort to increase revenues. In selling directly to the end user, manufacturers are competing with its indirect sales force and create what is often referred to as a channel conflict. Accordingly, the direct manufacture is caught between its desire to maximize direct sales and at the same time provide its indirect sales force (e.g., value-added resellers) with adequate incentive to market and sell the product.

Therefore, there is a need to provide a system to address such channel conflict.

SUMMARY OF THE INVENTION

The present invention is directed to a method for reducing channel conflict between a manufacturer's direct sales channel and an indirect sales channel employed by independent retailers or resellers. The method generally includes receiving and filling customer orders through both the indirect and direct sales channel. A defined portion of revenue derived through the direct sales channel is placed into a compensation pool. At the end of each distribution cycle, the compensation pool is distributed among a plurality of sellers in the indirect sales channel based on sales made by such sellers.

In one embodiment, a channel conflict compensation is derived by multiplying an amount of sales commission earned by a particular seller by a ratio of total amount of resources in the compensation pool over total sales commission earned by all qualified sellers in the indirect sales channel (TCP/TSC). In one implementation of this embodiment, a maximum limit of the ratio (TCP/TSC) is set at a predetermined value (e.g., one) to prevent sellers in the indirect sales channel from receiving more channel conflict compensation from the commission pool than their commission compensation realized from their own sales.

The present invention also is directed to an apparatus for tracking sales made by the manufacturer and resellers, compiling such information, calculating the amount of money placed in the compensation pool and allocating to resellers a determined amount.

DETAILED DESCRIPTION OF THE INVENTION

Implementations of the present invention are described herein for purposes of illustration, namely a method and a corresponding system to address a channel conflict between an indirect sales channel (e.g., independent distributors or resellers) and a direct sales channel (i.e., sale of a product and/or services directly by the original equipment manufacturer). It should be noted that the term "channel conflict" in the context of the present invention is used to describe any situation in which a direct sales channel and an independent distributor channel compete for the sale of the same product/service. According to one embodiment of the present invention, the minimization of channel conflict will be described as it relates to the computer hardware/services industry. However, it should be understood that the method and system of the present invention can be applied to other industries experiencing a channel conflict between a direct sales channel and an indirect sales channel.

Figure 1:
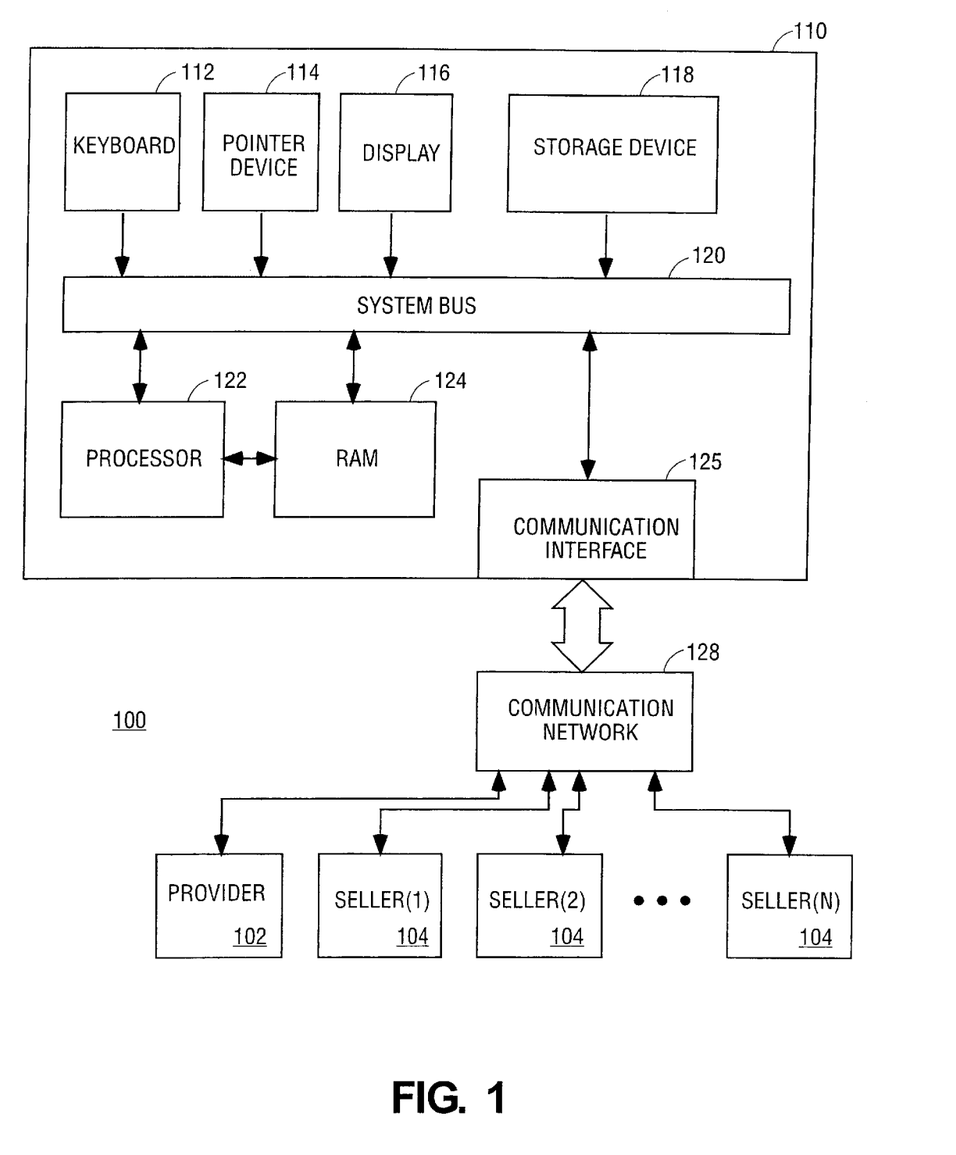
FIG. 1 is a block diagram illustrating a system for receiving and processing customer order information in accordance with one embodiment of the present invention.

Referring to FIG. 1, a block diagram of a system 100 for receiving and processing customer order information in accordance with one embodiment of the present invention is shown. Illustrated in FIG. 1 is a company (e.g., OEM) (referred as "provider" 102) providing products/services via both direct and indirect sales channels. The direct sales channel can be implemented in a number of different ways. For example, the product/service provider 102 may take orders directly from customers via its Web site or other types of direct ordering system (e.g., phone or mail direct ordering). In addition, the provider 102 may also employ its own direct sales force to further enhance its market coverage. Also illustrated in FIG. 1 are independent sellers and distributors participating in the indirect sales channel, which may include distributors, resellers, value-added resellers, dealers and the like (generally referred as sellers 104 in FIG. 1).

The system 100 includes a computer system 110 in which a software program of the present invention may be implemented. (In another embodiment of the invention, the calculations may be performed manually without a computer system or software.) The computer system may receive customer order information directly (e.g., via Internet, wired communications network, wireless communication network, etc) from the sellers and/or customers. In one embodiment, the computer system is embodied in the form of a Web server, which is configured to receive customer order information directly via an online order system. The customer order information can also be received indirectly by the computer system. For example, the customer order information may also be recorded on a physical medium such as a customer order form, embodied in the form of diskette or paper, and manually entered into the computer system by a local staff.

The computer system 110 may be any computing device capable of performing sequential program execution, including personal computers, minicomputers or mainframes. The computer system includes a system bus 120 to which various components are coupled, such as a communication interface 125 (e.g., modem) which enables communications with external devices, such as computers located at indirect sellers' facilities 104. The computer system includes a processor 122, which performs processing functions and a storage device 118 which stores, among other things, the customer order information. Connected to the processor 122 is a random access memory (RAM) 124 into which an operating system and the software program of the present invention are loaded. Also connected to the system bus 120 are input devices such as a keyboard 112 and a mouse 114 and a display unit 116. The software programs of the present invention may be stored on a machine-readable medium (e.g., read only memory (ROM), random access memory (RAM), magnetic disk storage mediums, optical storage mediums, flash memory devices, etc.), representing sequences of instructions which, when executed by an apparatus (e.g. processor), cause the apparatus to perform the operations described below.

Figure 6:
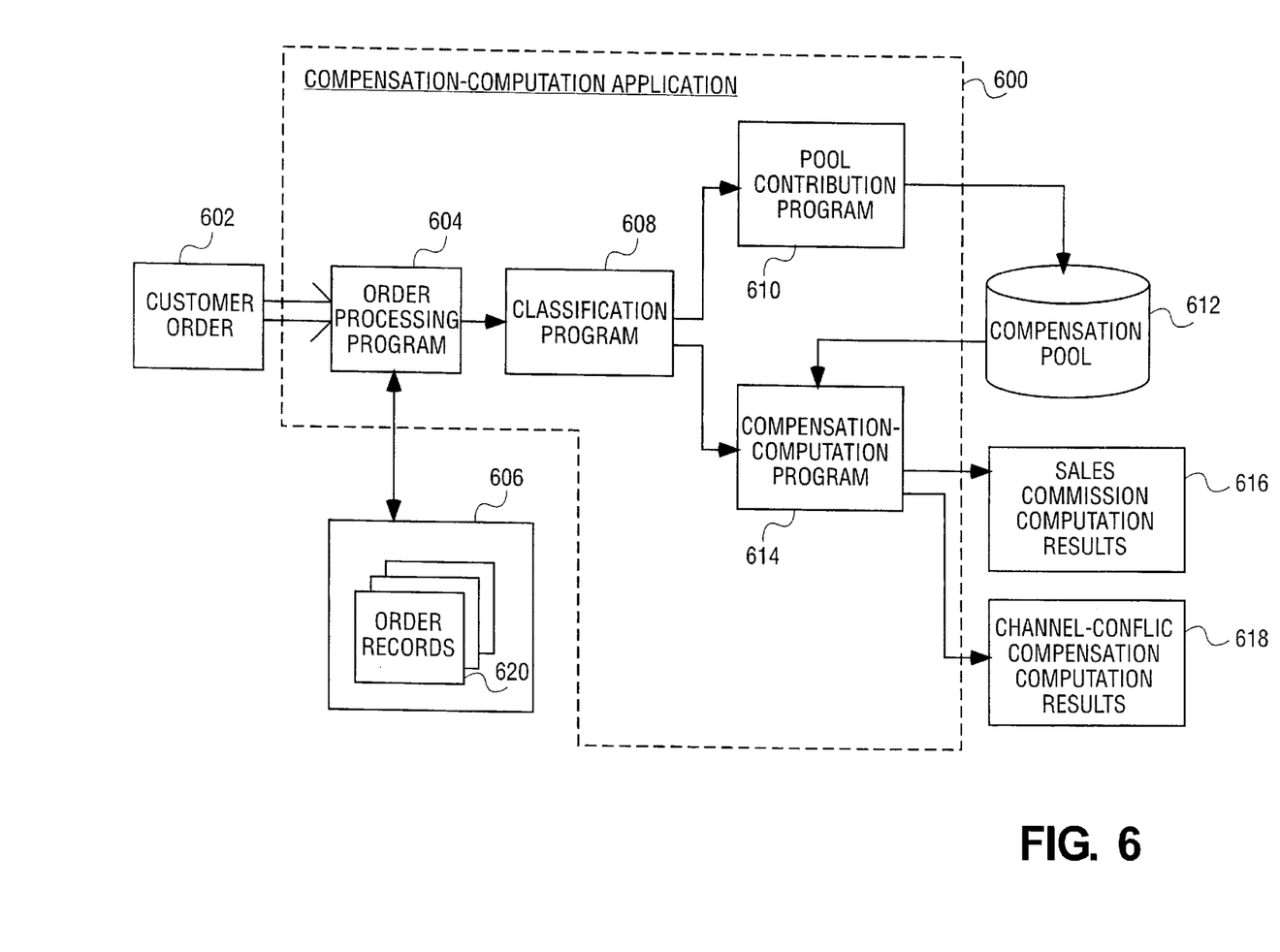
FIG. 6 is a block diagram illustrating a compensation-computation application for allocating and computing royalty/commission payments according to one embodiment of the present invention.

FIG. 6 depicts a block diagram of a compensation-computation application (CCA) 600 for allocating and computing royalty/commission payments according to one embodiment of the present invention. The customer order information 602 received by the computer system is processed by the CCA 600 running on the computer system. The CCA 600 includes an order processing program 604, a classification program 608, a pool contribution program 610, a compensation-computation program 612. First, the order processing program 604 processes the customer order by performing, among other things, operations necessary for storing the customer order information in a storage device 606. In one embodiment, the information relating to an order is stored as a database record 620, where each order record includes a number of data fields which may include for example, seller's identification number, date of the transaction, information about the client, system number, subscription number, etc. A unique number (referred as seller identification number) is assigned to each independent seller to track the origin of the order. Then, a classification program 608 examines the customer order and classifies it as being "direct sales" (i.e., received via a direct sales channel) or "indirect sales" (i.e., received via an indirect sales channel).

Based on this information, the CCA 600 either proceeds with the pool contribution program 610 or the compensation-computation program 614. For direct sales orders, the pool contribution program 610 allocates a predetermined portion of the revenue generated from the order into the compensation pool 612. The accumulation of money in the compensation pool gets distributed at the end of each channel-conflict compensation distribution cycle. For indirect sales orders, the compensation-computation program 614 computes a sales commission and a channel-conflict compensation associated with each order. The details of contributions to the compensation pool and computation of the channel-conflict compensation will be discussed more in detail with reference to FIGS. 3 and 4. The CCA 600 may be configured to provide the results of the sales commission computation 616 and the channel-conflict compensation computation 618 to a user (e.g., seller). The channel-conflict compensation 618 provides sellers with additional incentive to sell a product/service even when the OEM implements a strategy to push more products/services through its direct channel. Accordingly, the present invention enables the OEM to sell its products/services directly, without causing channel conflict to the independent distributors in the indirect sales channel.

Figure 2:
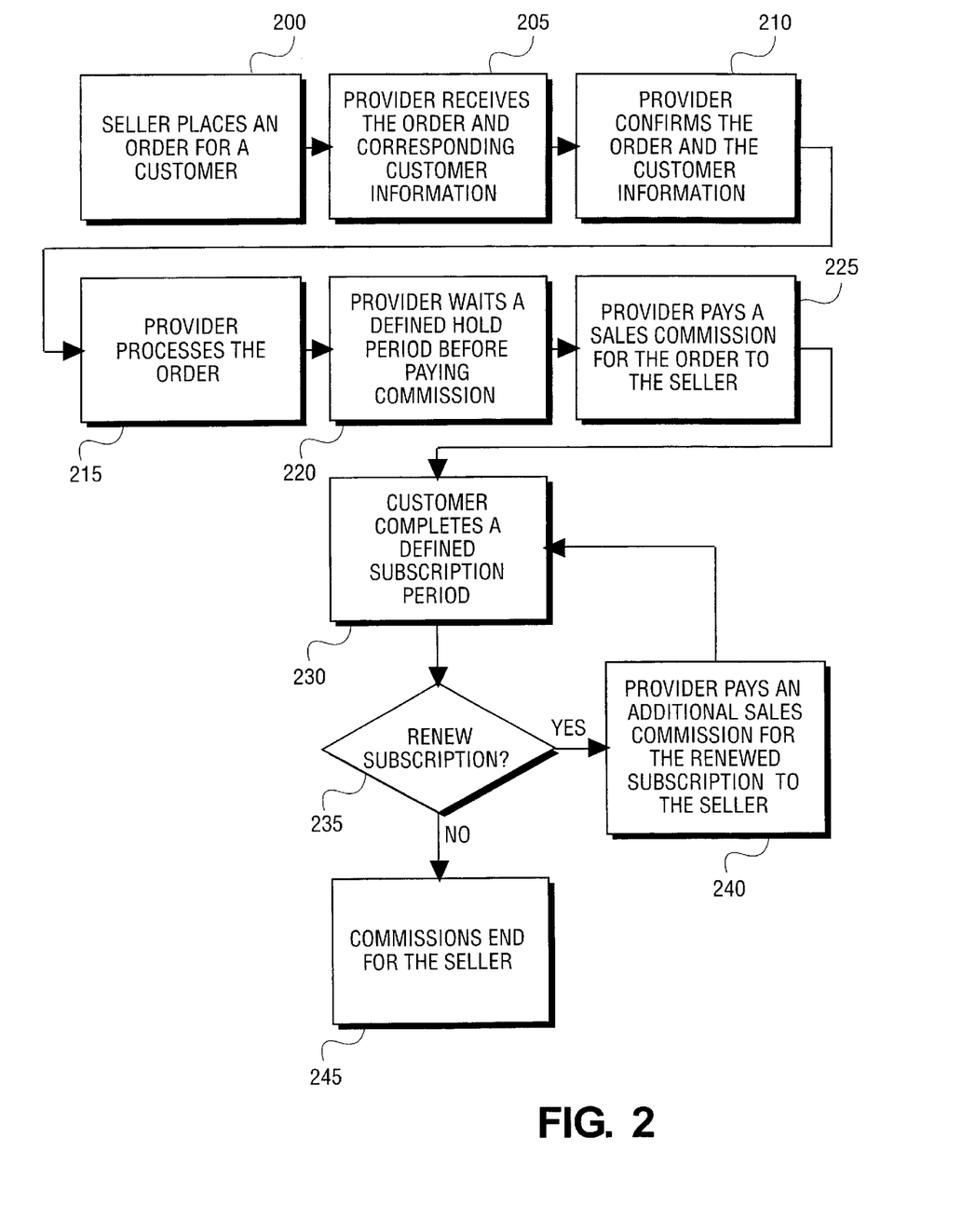
FIG. 2 is a flowchart diagram illustrating a sales commission computation operation according to one embodiment of the present invention.

Referring to FIG. 2, a flowchart of operations of computing a sales commission according to one embodiment of the present invention is shown. In functional block 200, a seller places an order (e.g., for product and/or service) for a customer by transmitting an order form, which contains information about the customer as well as the product/service requested. The information about the order is received by the provider of the product/services ordered (e.g., OEM) (block 205). The provider confirms the customer information and the order in block 210. The order and corresponding information is then transferred to the computer system at the provider's office, where the order processing program processes the order and stores the information relating to the order in a file or database system for future use. Typically, the customer has a predefined hold period during which the product/service can be returned/cancelled without obligation. Accordingly, the sellers are entitled to the sales commission only after the product/service has been retained by the customer for the entire duration of the predefined hold period (block 220). In this embodiment, if the customer does not return/cancel the product/service beyond the hold period, the provider pays a sales commission/royalty for the order to the seller (block 225).

In one embodiment, the product/service provided by the provider is subscription computing. The subscription computing may be, for example, a monthly subscription service that includes a computer (e.g., PC), a set of application software, technical support and Internet access. In this case, the seller is entitled to an additional sales commission if the customer renews the subscription after completing a predetermined subscription period. Accordingly, if the customer completes the initial subscription period (block 230), it is next determined whether the customer renews the subscription in decision block 235. If the customer renews the subscription (block 235, YES), the product/service provider pays additional sales commission to the seller for the subscription renew. The loop (blocks 230–240) is continued until the customer either cancels the subscription or fails to renew at the end of a subscription period (block 235), and terminates in block 245, where the seller is no longer entitled to additional sales commission with respect to the current order.

Figure 3:
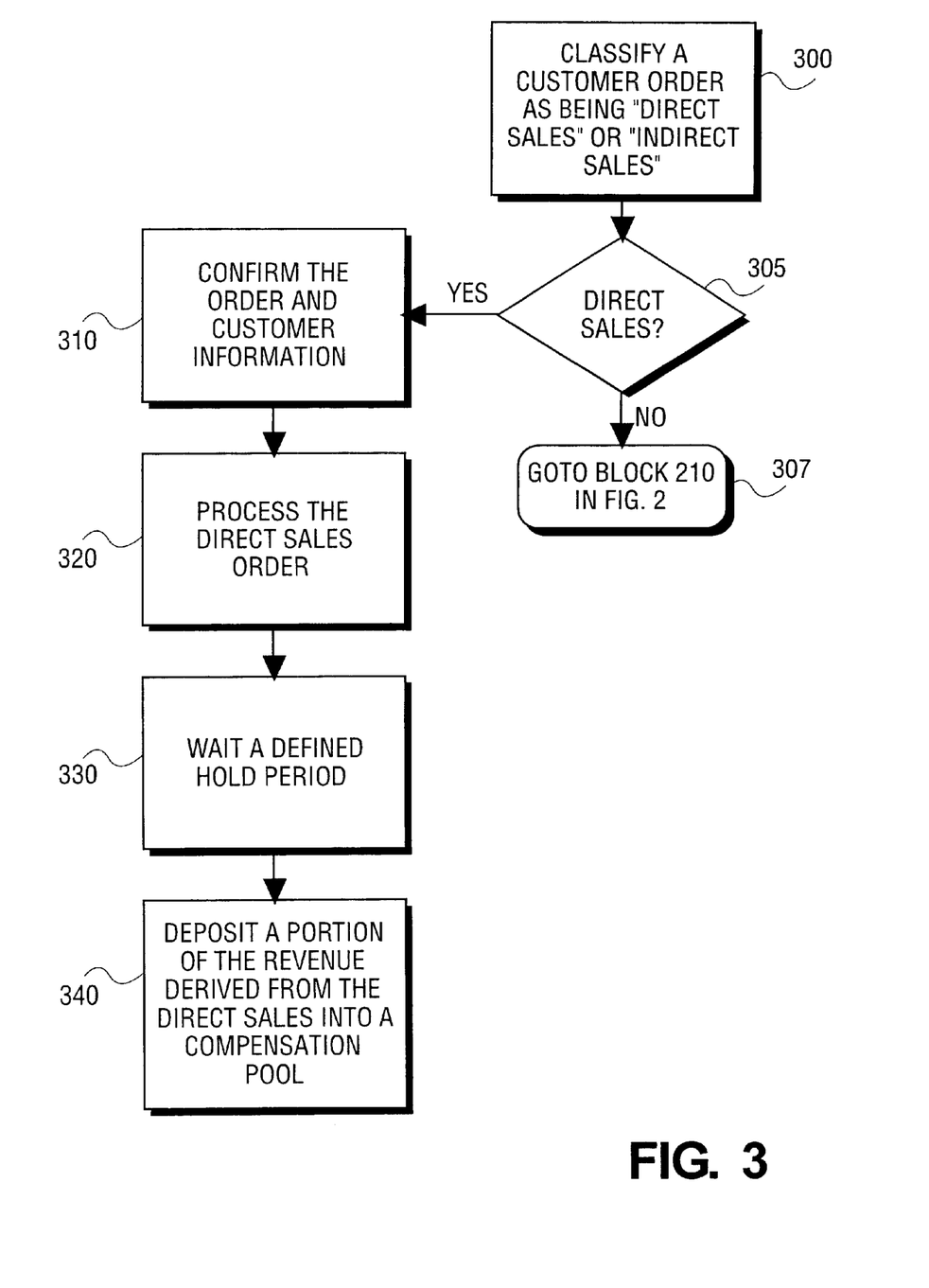
FIG. 3 is a flowchart diagram illustrating a compensation pool contribution operation according to one embodiment of the present invention.

FIG. 3 depicts a flowchart of operations for allocating deposits into a compensation pool, according to one embodiment of the present invention. In one embodiment of the present invention, the product/service provider may reduce channel conflict by sharing its direct sales commissions with the sellers participating in the indirect sales channel. First, a customer order is classified as being "direct sales" (i.e., received via a direct sales channel) or "indirect sales" (i.e., received via an indirect sales channel) in block 300. The royalty or commission payment for an order received via an indirect sales channel is paid directly to the responsible seller and the system of the present invention proceeds to block 210 in FIG. 2.

If the customer order was received via a direct sales channel (block 305, YES), the provider confirms the order and corresponding customer information in block 310. The provider then processes the order and stores order related information in a file system or a database for future record (Block 320). After a predefined hold period (block 330), the provider allocates a portion of the revenue derived from the direct sales into the compensation pool in block 340. This compensation pool is distributed periodically (e.g., annually) to sellers in the indirect sales channel based on their sales of the provider's products/services.

Figure 4:
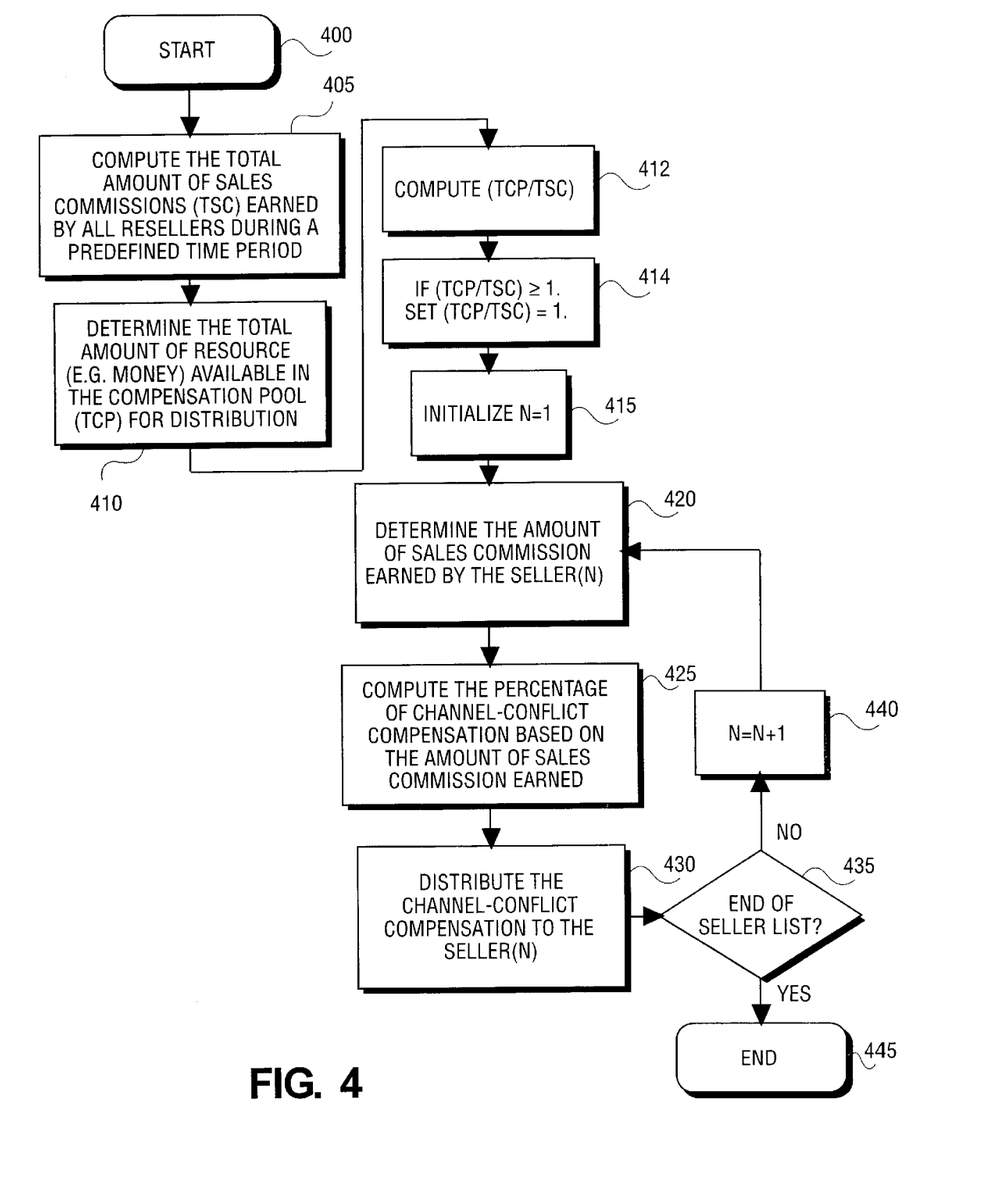
FIG. 4 is a flowchart diagram illustrating a channel-conflict compensation computation operation according to one embodiment of the present invention.

FIG. 4 depicts a flowchart of operations for computing channel-conflict compensation, according to one embodiment of the present invention. At periodic intervals (e.g., annually), the company distributes the resource (e.g. money) accumulated in the compensation pool to qualified seller(s) in the indirect sales channel. In one embodiment of the present invention, the compensation pool is distributed to each seller based on the seller's sales of the provider's products/services. During the course of each periodic distribution interval, the order processing application may receive large quantities of data regarding customer orders. The computation of the compensation may be carried out by the channel-conflict compensation application (CCA) of the present invention. The execution of the CCA begins at block 400, where it reads data (e.g., relating to the compensation pool and orders placed by the resellers) stored in memory. The total amount of sales commissions (TSC) earned by all the sellers in the indirect sales channel during a predefined time period is then calculated (block 405). The total amount of resources (e.g., money) in the compensation pool (TCP) available for distribution to the independent sellers is determined (Block 410). Then in block 412, the computed values TSC and TCP are used to derive a ratio of total amount of resources in the compensation pool over the total sales commissions earned by the sellers (TCP/TSC).

Once the ratio (TCP/TSC) is determined the application proceeds in a loop (blocks 420–440) to compute the amount of channel-conflict compensation earned by each of the independent sellers and processed sequentially. The loop works its way through a list of indirect sellers, which may be sorted by the seller's identification number. An index number N is initialized; i.e., the index number is set to one (block 415) prior to the loop (blocks 420–440). The index number N is used to identify the indirect sellers. For example, if seller (2) places an order, seller identification number 2 will be entered by the order processing application to ensure that this particular customer order can be traced and credited to the proper seller (2). At the start of each loop (block 420), the CCA determines the amount of sales commission earned by the seller (N) during a predetermined time interval. Based on the amount of sales commission earned by the seller, the CCA computes the amount of channel-conflict compensation the seller (N) is entitled to in block 425. For example, in one embodiment, the channel-conflict compensation may be derived by multiplying the amount of sale commission earned by the seller (N) by the ratio (TCP/TSC). The channel-conflict compensation is then distributed to a respective seller (N) (block 430). After each seller's channel-conflict compensation has been computed, the index number N is incremented by one and proceeds to calculate the next seller's compensation. This loop is continued until the compensation for all the sellers has been computed (block 435, YES) and terminates in block 445.

As discussed above, the channel-conflict compensation may be derived by multiplying the amount of sales commission earned by a particular seller by the ratio (TCP/TSC). In one embodiment, a maximum amount of channel conflict compensation that can be received by a seller is imposed by applying a maximum limit to the ratio (TCP/TSC). For example, if the value of ratio (TCP/TSC) exceeds one (i.e., more commission was generated through the direct sales channel than through the indirect sales channel), each seller in the indirect sales channel will receive more compensation through the channel conflict compensation program than through his/her own sales. In one implementation, a maximum limit of the ratio (TCP/TSC) is set at a predetermined value (e.g., one) to ensure that sellers in the indirect sales channel do not receive more compensation from the commission pool than their own sales commission. In such implementation, the ratio (TCP/TSC) is examined by the CCA and if it determines that the ratio is greater than one, the ratio (TCP/TSC) will be set to equal one (block 414).

Figure 5:
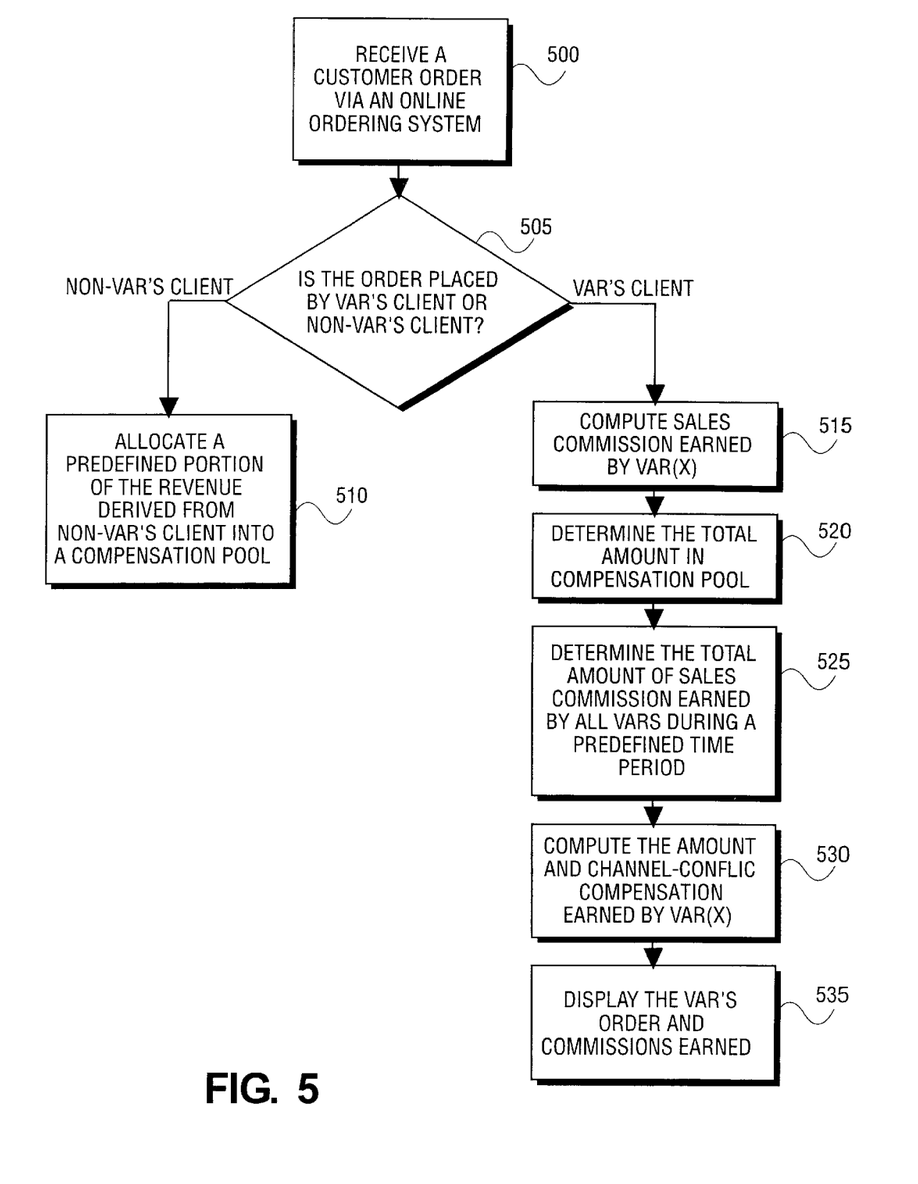
FIG. 5 is a flowchart diagram illustrating operations for receiving customer orders over an online order system and computing commissions associated with the order according to one embodiment of the present invention.

FIG. 5 depicts a flowchart diagram of operations for receiving customer orders over an online order system and computing commissions associated with the order, according to one embodiment of the present invention. In this embodiment, a customer may place an order directly on the OEM's Web site or the OEM's Web site may be linked via another Web site operated by a value-added reseller (VAR) in the indirect sales channel. In this regard, once a customer order is received by the OEM's online ordering system (block 500), it is determined whether the order was placed by a non-VAR's customer or by a VAR's customer in decision block 505. If the order was received directly from a non-VAR customer (block 505), a predefined portion of the revenue derived from this order (once collected) is allocated into a compensation pool in block 510. If the order was received from a VAR's customer, a sales commission associated with such order is computed and distributed to the appropriate VAR (block 515). Then, in order to estimate the amount of channel-conflict compensation associated with the current order, the compensation-computation program (614 in FIG. 6) first determines the total amount of resources available in the compensation pool for distribution (block 520). Next, the total amount of sales commissions earned by all VARs during the current channel-conflict compensation distribution cycle is determined (block 525). Based on the values determined in blocks 520 and 525, the compensation-computation program estimates the amount of channel-conflict compensation associated with the current order (block 530). When the VAR logs into the OEM's reseller Web site, a Web page displaying VAR's orders and the estimated amount of channel-conflict compensation associated with each order maybe viewable (block 535).

The implementations of the present invention provides the resellers with additional incentive to sell a product/service even when the OEM implements a strategy to increase sales of its products/services through a direct channel and enables the OEM to sell its products/services directly to consumers, without creating channel conflict.

While the foregoing embodiments of the invention have been described and shown, it is understood that variations and modifications, such as those suggested and others within the spirit and scope of the invention may occur to those skilled in the art to which the invention pertains. The scope of the present invention accordingly is to be defined as set forth in the appended claims.

What is claimed is:

1. A method for reducing sales channel conflict, comprising:

receiving orders through an indirect sales channel;

receiving orders through a direct sales channel;

using a computer system, allocating a portion of revenue derived through the direct sales channel into a compensation pool; and distributing the compensation pool to sellers responsible for sales made through the indirect sales channel at the end of a distribution cycle.

2. The method of claim 1, wherein the compensation pool is distributed to the sellers based on a sales contribution of the seller.

3. The method of claim 1, wherein the compensation pool is distributed to each respective seller in the indirect sales channel based on a ratio (TCP/TSC) of a total amount of resources in the compensation pool (TCP) over a total amount of sales commissions earned by the sellers (TSC), wherein a maximum limit of said ratio (TCP/TSC) is set at a predetermined value to ensure that the sellers in the indirect sales channel do not receive more compensation from the commission pool than sales commission of the sellers.

4. The method of claim 1, wherein some of the orders are received via an online order system.

5. The method of claim 1, wherein the distribution of the compensation pool to a respective seller is based on a sales contribution of the seller made during the distribution cycle.

6. The method of claim 1, further comprising filling the orders by delivering a product/service to a customer.

7. The method of claim 5, wherein the sellers are entitled to the distribution of the compensation pool only for the product/service that has been paid for and retained by a customer for a predetermined hold period.

8. The method of claim 2, further comprising:

computing a sales commission associated with each order derived through the indirect sales channel; and distributing the sales commission to the sellers after a product/service associated with the order has been retained by a customer for a predetermined hold period, wherein the sales contribution of the seller is the sum of all sales commissions received during the distribution cycle.

9. The method of claim 1, wherein the allocation of a portion of direct sales revenue into the compensation pool, and the distribution of the compensation pool are automatically implemented by a software program.

10. An apparatus comprising a machine-readable medium containing instructions, which when executed by a machine, cause the machine to perform operations comprising:

examining orders placed within a defined time period;

identifying direct orders that were derived through a direct sales channel;

identifying indirect orders that were derived through an indirect sales channel;

computing revenue derived from the direct orders; and allocating a portion of revenue derived from the direct orders into a compensation pool to be distributed to a seller in the indirect sales channel.

11. The apparatus of claim 10, wherein the operations further comprise computing a channel conflict compensation for a seller in the indirect sales channel based on a sales contribution of the seller and an amount in the compensation pool.

12. The apparatus of claim 11, wherein said channel conflict compensation for a seller in the indirect sales channel is computed based on a ratio (TCP/TSC) of a total amount of resources in the compensation pool (TCP) over a total amount of sales commissions earned by all qualified sellers (TSC), wherein a maximum limit of said ratio (TCP/TSC) is set at a predetermined value to ensure that said channel conflict compensation is less than sales commission realized by the seller.

13. The apparatus of claim 10, wherein the operations further comprise:

computing a sales commission associated with each indirect order;

computing a sales contribution of the seller by adding sales commissions earned by the seller during a distribution period;

comparing the sales contribution of the seller with a total sales contribution made by all sellers; and computing a compensation of the seller from the compensation pool based on the sales contribution of the seller compared with the total sales contribution.

14. A computer system comprising:

a data storage device to store data;

an order processing subsystem to process a customer order and store information related to the customer order in the data storage device;

a classification subsystem to classify the customer order as being placed through one of an indirect sales channel and a direct sales channel;

a pool contribution subsystem to allocate a predetermined portion of revenue generated from the customer order into a compensation pool; and a compensation-computation subsystem to compute a sales commission and a channel-conflict compensation associated with the order.

15. The system of claim 14, wherein the channel-conflict compensation associated with the order is computed based on (1) an amount of resource in the compensation pool and (2) an amount of sales commission earned by sellers through the indirect sales channel during a channel-conflict compensation distribution cycle.

16. The system of claim 14, further comprising an online order subsystem to receive orders over the Internet.

17. The system of claim 16, wherein the online order subsystem is embodied in the form of a Web site which is directly accessible by a customer.

18. The system of claim 16, wherein the online order subsystem is embodied in the form of a Web site which is capable of being linked via another Web site provided by a value-added reseller (VAR) in the indirect sales channel.

19. An apparatus comprising:

means for examining orders placed within a defined time period;

means for identifying direct orders that were derived through a direct sales channel;

means for identifying indirect orders that were derived through an indirect sales channel;

means for computing revenue derived from the direct orders; and means for allocating a portion of the revenue derived from the direct orders into a compensation pool to be distributed to a seller in the indirect sales channel.

20. The apparatus of claim 19, further comprising means for computing a compensation for the seller in the indirect sales channel based on a sales contribution of the seller and an amount in the compensation pool.

21. The apparatus of claim 19, further comprising:

means for computing a sales commission associated with each indirect order;

means for computing a sales contribution of the seller by adding sales commissions earned by the seller during a distribution period;

means for comparing the sales contribution of the seller with a total sales contribution made by all sellers; and means for computing a compensation of the seller from the compensation pool based on the sales contribution of the seller compared with the total sales contribution.

22. A system comprising:

a data storage device to store data;

order processing means for processing a customer order and store information related to the customer order in the data storage device;

classification means for classifying the customer order as being placed through one of an indirect sales channel and a direct sales channel;

pool contribution means for allocating a predetermined portion of revenue generated from the customer order into a compensation pool; and compensation-computation means for computing a sales commission and a channel-conflict compensation associated with the order.

23. The system of claim 22, wherein the channel-conflict compensation associated with the order is computed based on (1) an amount of resource in the compensation pool and (2) an amount of sales commission earned by sellers through the indirect sales channel during a channel-conflict compensation distribution cycle.

24. The system of claim 22, further comprising an online order subsystem to receive orders over the Internet.

25. The system of claim 24, wherein the online order subsystem is embodied in the form of a Web site which is directly accessible by a customer.

26. The system of claim 24, wherein the online order subsystem is embodied in the form of a Web site which is capable of being linked via another Web site provided by a value-added reseller (VAR) in the indirect sales channel.

* * * * *